Patented July 2, 1946

2,403,267

UNITED STATES PATENT OFFICE 2,403,267

DIESEL FUELS

Garland H. B. Davis, Elizabeth, N. J., assignor to Standard Oil Development Company, a corporation of Delaware No Drawing. Application August 24, 1943, Serial No. 499,821

7 Claims. (Cl. 44—70)

This invention relates to novel fuels for high compression ignition engines such as Diesel engines, and more particularly it relates to the preparation of Diesel fuels of high ignition quality and low cloud point.

It is known in the art to add pour point depressors to Diesel fuels in order to permit their flowing readily at low temperatures; but the mere depressing of the pour point of the fuel has not permitted the operation of Diesel engines at low temperatures because hitherto the pour point depressors have not been found to change the cloud point, which latter is the true limiting temperature in actual practice. It is a primary object of the present invention to lower the cloud point of Diesel fuel base stocks, particularly of those having high ignition qualities as indicated by a high cetane number or a high Diesel index (which is the mathematical product of the °A. P. I. gravity times the aniline point in °F. divided by 100).

According to the present invention it has been found that a class of materials heretofore used as a pour depressor in lubricating oils has the surprisingly unexpected property of reducing or depressing the cloud point of Diesel fuel base stocks when added thereto in small amounts. Broadly, the invention comprises adding to a hydrocarbon fuel base stock suitable for use as compression ignition fuel, a small amount of a polymerized alkyl ester of acrylic acid or methacrylic acid.

These polyacrylic esters may be considered as polymers of esters having the general formula

R—OOC—C(X)=CH$_2$ in which R is an unsubstituted or substituted aliphatic, aromatic or hydroaromatic group, preferably containing at least 10 carbon atoms of which preferably at least 4 are aliphatic, and X is a hydrogen or a halogen atom or a methyl group or an ethyl group. If X is a methyl group the ester is referred to as an alpha methacrylate. The group R may represent various monohydric aliphatic alcohol groups, such as amyl, hexyl, heptyl, octyl, lauryl, cetyl, octadecyl, etc., and such groups may be straight chained or branched such as isoamyl, and particularly such as an isooctyl group formed by the polymerization of two mols of isobutylene, which may be referred to as the diisobutyl group. Also, R may also be an alkylated aromatic group such as butyl phenyl, amyl phenyl, etc., or a cycloaliphatic group such as cyclohexyl. Thus specific examples of suitable monomeric esters are: amyl acrylate, lauryl acrylate, cetyl acrylate, octadecyl acrylate, amyl methacrylate, lauryl methacrylate, cetyl methacrylate, octadecyl methacrylate, amylphenyl methacrylate, cyclohexyl methacrylate, cyclohexyl fluoracrylate. Copolymers of the above and other acrylic esters may be used; for example, a copolymer of ethyl acrylate and lauryl methacrylate.

It should be understood of course that when any of the above esters are polymerized, the polymerization should not be carried to such an extent as to form polymers which are insoluble in the Diesel fuel base stocks to be used. Normally the polymer should have a molecular weight of about 7000 to 15000. The polymerization may be carried out by methods known to the art, such as by heating mildly in the presence of a small amount of benzoyl peroxide, but the method of polymerization is not part of this invention.

Although polymers of the various esters listed above, or mixtures thereof may be used, it is preferred to use polymers of methacrylic acid esters of monohydroxy aliphatic alcohols having 4 to 12 carbon atoms, such as polylauryl methacrylate.

The amount of the polyacrylic ester to be used will, of course, depend upon the cloud point of the Diesel fuel base stocks and the cloud point desired in the finished Diesel fuel blend, but normally the amount should be about 1–20% by weight, and usually about 5–10% will be suitable. Generally the exact amount to be used should be that required to cause the finished Diesel fuel blend to have a cloud point below about —20° F., or for some colder climate or high altitude aviation purposes, even below —40° F.

The hydrocarbon fuel base stocks to be used in preparing the compression ignition engine fuels should be one having a boiling range within the limits of about 300–800° F., and preferably about 400–750° F. Such stocks may be obtained from paraffinic crudes or naphthenic crudes or mixed base crudes.

The invention is particularly applicable to the use of low pour point base stocks such as hydrogenated naphthenic gas oils, or raffinates from solvent extraction, etc., which generally have cloud points considerably higher than their pour points. The invention is of particular advantage for use with paraffinic Diesel fuel base stocks normally having a cloud point above —10° F., and even more useful with base stocks having a cloud point above 0° F.

The primary importance of this invention lies in the fact that the cloud point, being the temperature at which crystals of wax appear in the Diesel fuel, is a direct measure of the minimum temperature at which the Diesel fuel can be used without clogging the filter in the fuel line. Therefore, the invention has the particular advantage that it permits the use of higher cetane number hydrocarbon base stocks which normally have a high cloud point, without clogging the fuel line filter when used at very low temperatures. The invention has an additional advantage, although of relatively minor importance, that the particular class of substances used as cloud point depressor happens also to be a pour point depressor.

As an example of the operation of the invention it may be shown that the cloud point of a mixed paraffinic and naphthenic Diesel fuel base stock (derived from Pecos and World crudes) and having an aniline point of 176° F., was reduced from +2° F. to −46° F. by the addition of 7% of polylauryl methacrylate having a molecular weight of about 9000.

The cloud point depressors of this invention do not decrease the cetane number of the hydrocarbon fuel base stock because they usually increase the aniline point, and it is well known that the cetane number is generally proportional to the aniline point.

It is not intended that the invention be limited to the specific examples which have been recited merely for the sake of illustration.

I claim:

1. Fuel for a compression ignition engine comprising a hydrocarbon fuel base stock having a boiling range within the limits of about 300–800° F., and a small amount of a soluble polyacrylic acid ester dissolved therein.

2. Fuel according to claim 1 containing about 1–20% of a polymethacrylic acid ester of a monohydroxy alcohol having about 4 to 12 carbon atoms.

3. Fuel according to claim 1 containing about 5–10% of polylauryl methacrylate.

4. A Diesel fuel comprising a major proportion of a hydrocarbon fuel base stock having a boiling range within the approximate limits of 400–750° F., and normally having a cloud point above −10° F., in which has been dissolved about 5% to 10% of a soluble polymethacrylic acid ester of a monohydroxy alcohol having about 4 to 12 carbon atoms in amount sufficient to reduce the cloud point to below −20° F.

5. Diesel fuel according to claim 4 in which the hydrocarbon fuel base stock is a paraffinic one having a cloud point above 0° F., and in which the polyacrylic acid ester is used in sufficient amount to reduce the cloud point to below −40° F.

6. A Diesel fuel comprising a major proportion of a hydrogenated naphthenic gas oil and dissolved therein about 1–20% of a soluble polymethacrylic acid ester of a monohydroxy alcohol having about 4 to 12 carbon atoms, in amount sufficient to reduce the cloud point to below −20° F.

7. The method of reducing the cloud point of Diesel fuel base stocks which comprises adding thereto a small amount of a soluble polyacrylic acid ester soluble therein.

GARLAND H. B. DAVIS.